July 24, 1956 J. F. KLINKHAMER 2,756,395

ELECTRIC FOUR TERMINAL FILTER NETWORK

Filed Jan. 2, 1953

INVENTOR

JACOB FREDERIK KLINKHAMER

BY [signature]

AGENT

United States Patent Office 2,756,395

Patented July 24, 1956

2,756,395

ELECTRIC FOUR TERMINAL FILTER NETWORK

Jacob Frederik Klinkhamer, Eindhoven, Netherlands, assignor to Hartford National Bank and Trust Company, Hartford, Conn., as trustee Application January 2, 1953, Serial No. 329,400

Claims priority, application Netherlands January 18, 1952

6 Claims. (Cl. 333—71)

This invention relates to electric four-terminal filter networks comprising a magnetostrictive vibrator acting in this instance as a tuned circuit of high tank quality so that it is eminently suitable as an element of the four-terminal network for obtaining a band-pass filter characteristic curve with steep edges at the cut-off frequencies. To this end the four-terminal network comprises reactances in the shunt branches, the magnetostrictive vibrator being inserted in a series branch.

It has, however, been found that such a network without additional means is unsuitable for transmitting wide frequency bands. In accordance with the recognition on which the invention is based this is due to a characteristic property of the vibrator itself.

According to the invention, the said four-terminal filter network, in which the vibrator winding is provided in the series branch and whose shunt branches comprise reactances to the effect of creating a greater frequency difference between the attenuation poles of the four-terminal network, a tapping on said winding is connected through a reactance to that end of the first-mentioned reactances which is remote from the vibrator winding. This expedient fits the four-terminal network for transmitting wider bands with a minimum of additional parts.

In order that the invention may be readily carried into effect it will now be described with reference to the accompanying drawing, given by way of example, in which.

Figure 1:
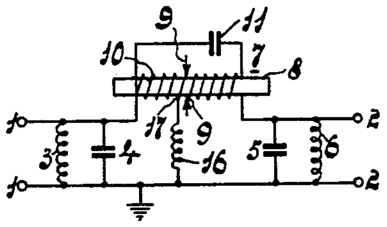
Fig. 1 shows an electric four-terminal filter network according to the invention.

The four-terminal filter shown in Fig. 1 comprises input terminals 1 and output terminals 2 and may form part of a ladder network. The shunt branches between the input terminals 1 and output terminals 2 comprise reactances 3, 4, 5, 6 constituting tuned circuits with resonant frequencies usually located within the band to be transmitted. The series branch comprises a magnetostrictive vibrator 7 consisting of a vibratory member 8 of magnetostrictive material, which member is supported at clamping points 9, and surrounded by a winding 10. A capacitor 11 is connected in parallel with the vibrator winding 10.

Figure 2:
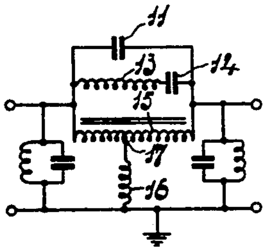
Fig. 2 shows the equivalent circuit diagram of the four-terminal filter network illustrated in Fig. 1.

Fig. 2 shows the equivalent circuit of said four-terminal network, wherein the vibrator 7 corresponds to a series-circuit 13, 14 with which an inductance 15 is connected in parallel. The elements 11, 13, 14, 15 constitute a series resonant circuit, for example, corresponding to the central frequency of the band to be transmitted, and parallel resonances, for example, corresponding to damping poles situated outside the pass band and near the cut-off frequencies.

If wide frequency bands are to be transmitted, said damping poles are generally situated too closely together, which, according to the idea underlying the invention, is due to the fact that the inductor 15 is found to have an excessively small value and particularly a value which is small relatively to that of the inductor 13.

In accordance with the invention, a reactance 16 in Fig. 1 is provided between a tapping 17 on the winding 10 of vibrator 7 and the end of the reactances 3, 4, and 5, 6 remote from said winding 10. Said reactance 16, which acts as an inductance in particular in respect of the natural frequency of the vibrator corresponds, as is known, to a negative inductance in parallel with the inductor 15 shown in Fig. 2. By judiciously proportioning the reactance 16 the inductor 15 may thus be made apparently much higher—if desired even infinitely high—so that the parallel resonance of the elements 11, 13, 14, 15 are spaced more widely apart.

Figure 3:
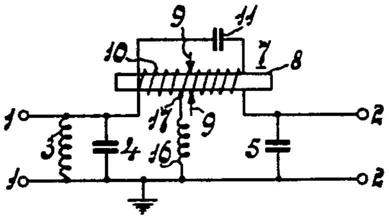
Fig. 3 shows a simplification of the four-terminal network shown in Fig. 1.

A judicious choice of the tapping 17 on winding 10 further permits one of the reactances in the shunt branches, for example, the inductor 3 or the inductor 6, to be simulated by the reactance 16 which should then be an inductor connected in series with the leakage self-inductance of winding 10. In this event the inductor 6, for example, may consequently be eliminated from the circuit as shown in Fig. 3, thus completely dispensing with additional circuit elements.

While we have thus described our invention with specific examples and embodiment thereof, other modification will be readily apparent to those skilled in the art without departing from the spirit and the scope of the invention as defined in the appended claims.

What I claim is:

1. An electric four-terminal frequency bandpass filter network comprising a pair of input terminals and a pair of output terminals, a magnetostrictive vibrator including a vibratory body of magnetostrictive material having a resonance frequency within the frequency bandpass of said network and a winding surrounding said body, said winding being connected between one input terminal and one output terminal, the other input terminal and the other output terminal being interconnected, a shunt branch connected across said input terminals, a shunt branch connected across said output terminals, each of said branches being provided with reactive components, and an inductive element connected between a point on said winding and said interconnected terminals to widen the frequency difference between the damping poles of said network.

2. An electric four-terminal filter network, as set forth in claim 1, wherein said inductive element has a predetermined value and is coupled to a point on said winding at which the reactance of said winding on one side of said point relative to the reactance of the winding on the other side of said point provides a simulated reactance constituting one of said components in one of said branches.

3. An electric four-terminal frequency bandpass filter network comprising a pair of input terminals and a pair of output terminals, a magnetostrictive vibrator including a vibratory body of magnetostrictive material having a resonance frequency within the frequency bandpass of said network and a winding surrounding said body, said winding being connected between one input terminal and one output terminal, the other input terminal and the other output terminal being interconnected, a shunt branch connected across said input terminals, a shunt branch connected across said output terminals, each of said branches being constituted by an inductance-capacitance parallel circuit, and an inductance element connected between a point on said winding and said interconnected terminals to extend the frequency difference between the damping poles of said network.

4. An electric four-terminal filter network, as set forth in claim 3, wherein said network further includes a capacitor connected across said winding.

5. An electric four-terminal filter network, as set forth in claim 4, wherein said network has a given bandpass characteristic with respect to a predetermined frequency range, and wherein said shunt branches constitute parallel resonant circuits with respect to given frequencies falling within said range.

6. An electric four-terminal frequency bandpass filter network comprising a pair of input terminals and a pair of output terminals, a magnetostrictive vibrator including a vibratory body of magnetostrictive material having a resonance frequency within the frequency bandpass of said network and a winding surrounding said body, said winding being connected between one input terminal and one output terminal, the other input terminal and the other output terminal being interconnected, a capacitor connected across said input terminals, a capacitor connected across said output terminals, an inductance element connected in parallel with one of said capacitors, and an inductance element connected between a point on said winding and said interconnected terminals to widen the frequency difference between the damping poles of said network.

References Cited in the file of this patent

UNITED STATES PATENTS

| | | |
|---|---|---|
| 1,624,655 | Johnson et al. | Apr. 12, 1927 |
| 1,672,968 | Whitehorn | June 12, 1928 |
| 1,967,249 | Mason | July 24, 1934 |
| 2,166,359 | Lakatos | July 18, 1939 |
| 2,187,805 | Landon | Jan. 23, 1940 |
| 2,660,712 | Landon | Nov. 24, 1953 |